United States Patent
Ra (10) Patent No.: US 9,435,567 B2
(45) Date of Patent: Sep. 6, 2016

(54) HEATING CONTAINER

(75) Inventor: Su-Hwan Ra, Gyeonggi-do (KR)

(73) Assignee: DOKDO CO., LTD., Seoul (KR)

( * ) Notice: Subject to any disclaimer, the term of this patent is extended or adjusted under 35 U.S.C. 154(b) by 366 days.

(21) Appl. No.: 13/992,077

(22) PCT Filed: Nov. 10, 2011

(86) PCT No.: PCT/KR2011/008544
§ 371 (c)(1),
(2), (4) Date: Jun. 3, 2014

(87) PCT Pub. No.: WO2013/069832
PCT Pub. Date: May 16, 2013

(65) Prior Publication Data
US 2014/0261381 A1 Sep. 18, 2014

(51) Int. Cl.
*F24J 1/00* (2006.01)
*A47J 36/24* (2006.01)
*B65D 81/18* (2006.01)
*A47J 27/04* (2006.01)

(52) U.S. Cl.
CPC ............... *F24J 1/00* (2013.01); *A47J 36/2405* (2013.01); *A47J 2027/043* (2013.01); *B65D 81/18* (2013.01)

(58) Field of Classification Search
CPC ............ F24J 1/00; A47J 33/00; A47J 36/24; B65D 81/18
USPC ............ 126/263.05, 233 R, 389.1, 246, 261; 206/515; 99/403
See application file for complete search history.

(56) References Cited

U.S. PATENT DOCUMENTS

| | | | |
|---|---|---|---|
| 3,871,357 A | 3/1975 | Gross | |
| 5,125,393 A * | 6/1992 | Levitin | A47J 36/36 126/376.1 |
| 6,698,337 B1 * | 3/2004 | Park | A47J 36/36 99/342 |
| 7,392,907 B2 | 7/2008 | Herbert | |
| 2013/0266613 A1* | 10/2013 | Lilly | A61K 39/102 424/234.1 |

(Continued)

FOREIGN PATENT DOCUMENTS

| IN | WO9947035 | * 9/1999 | A47J 39/02 |
|---|---|---|---|
| JP | 07-246162 A | 9/1995 | |

(Continued)

OTHER PUBLICATIONS

The Trend of Self-Heating Boxes Heating Boxes. Free Fire Boxes. Self-Heating Rice Boxes. Jan. 27, 2001. <http://www.mychemy.com/offer/94962043.html>.

(Continued)

*Primary Examiner* — Gregory Huson
*Assistant Examiner* — Nikhil Mashruwala
(74) *Attorney, Agent, or Firm* — Kaplan Breyer Schwarz & Ottesen, LLP (57) ABSTRACT

Provided is a heating container simply cooks or heats foods using a heater without help of a heating device required for cooking during the outdoor leisure activation such as climbing or fishing. The heating container includes a main body in which a heater is inserted and water is poured, a built-in container inserted into the main body, the built-in container providing a space for cooking foods therein, and a sealing cover sealing an opened upper portion of the built-in container, the sealing cover being coupled to the main body when the built-in container is sealed. Each of the main body and the built-in container is formed of a rigid material, and vapor generated when water within the main body is boiled is discharged between the main body and the built-in container to the outside.

7 Claims, 8 Drawing Sheets

(56) References Cited

U.S. PATENT DOCUMENTS

| | | | |
|---|---|---|---|
| 2015/0173550 A1* | 6/2015 | Kao | A47J 27/04 |
| | | | 219/401 |
| 2015/0241089 A1* | 8/2015 | Arnold | A45C 5/02 |
| | | | 126/263.01 |

FOREIGN PATENT DOCUMENTS

| | | |
|---|---|---|
| KR | 20-0418097 Y1 | 6/2006 |
| KR | 20-2009-0009347 U | 9/2009 |
| KR | 2010-0135994 | 12/2010 |
| WO | 2007098031 A2 | 8/2007 |

OTHER PUBLICATIONS hi.baidu.com/gyfaming. Apr. 7, 2009. <http://blog.sina.com/cn/s/blog_9b2799df01017ys4.html>.

"International Application No. PCT/KR2011/008544 International Search Report", Aug. 17, 2012, Publisher: KIPO, Published in: KR.

\* cited by examiner

HEATING CONTAINER

TECHNICAL FIELD

The present invention relates to a heating container, and more particularly, to a heating container which simply cooks or heats foods using a heater without help of a heating device required for cooking during the outdoor leisure activation such as climbing or fishing.

BACKGROUND ART

It is no difficult to cook or heat foods in the indoors because a heating device for cooking is equipped in the indoors. However, heating devices for cooking or heating foods such as a burner should be essentially prepared in the outdoor leisure activation such as climbing or fishing. In some places, such a heating device is limited or prohibited in use due to the environmental pollution and fire risk. As a result, it is difficult to cook or heat foods in the some places.

Thus, during the activation in the outdoors in which the cooking of foods is unpardoned, it is necessary to directly purchase foods on-side markets or store foods in a separate hot-food container for carrying. In a case where foods are stored in the hot-food container for carrying, this is inconvenient as well as uncomfortable due to a time limitation. Furthermore, it is impossible to simply cook desired foods at a desired place to eat the food.

To solve the above-described limitations, heating containers constituted by various components are being developed and used. For example, a heater bag sealed together with contents is provided within a container body. Thus, when the contents are heated, the heater bag is taken out, and then water is poured to react with the heater, thereby heating the stored contents (e.g., foods).

As described above, the related art heating container in which the heater is built in the container to cook or heat foods has an advantage in which foods can be immediately cooked in outdoors using the heater without a separate heating container. However, only instant foods may be stored in the container. Thus, it is difficult to store and carry foods directly prepared in the home.

Korean Utility Model Publication No. 20-2009-0009347 (hereinafter, referred to as a "prior document") which have been filed by the same applicant as the present invention discloses a heating container which is divided into a space for receiving a heater and a space for cooking foods to store and carry foods previously prepared in the home.

The heating container according to the prior document includes a built-in container for receiving cooked foods or foods to be cooked, a main body in which the built-in container is built and a heater is inserted, a sealing cover coupled to an upper portion of the main body in which the built-in container is inserted to seal the built-in container and the inside of the main body, the heater reacting with water within the main body to cause an exothermic reaction, thereby heating the water within the main body and thus heating the built-in container in which the foods are received, and a discharge hole for discharging vapor within the main body.

The heating container according to the prior document may simply cook or heat foods using the heater in the outdoors by previously preparing and storing the foods to cook the desired foods in the outdoors or by storing the cooked foods to heat the cooked foods.

However, the heating container according to the prior document should have a discharge hole for discharging vapor in a side of an upper portion thereof. Thus, an additional process for forming the discharge hole may be required. Also, since the built-in container is simply inserted into the main body, water may be introduced into the built-in container in a case where the main body is inclined.

DISCLOSURE OF THE INVENTION

Technical Problem

An object of the present invention is to provide a heating container which can completely seal a built-in container in which foods are contained to easily discharge vapor without processing a separate discharging hole, thereby preventing water from being introduced into the built-in container.

Technical Solution

According to an aspect of the present invention, there is provided a heating container including: a main body in which a heater is inserted and water is poured; a built-in container inserted into the main body, the built-in container providing a space for cooking foods therein; and a sealing cover sealing an opened upper portion of the built-in container, the sealing cover being coupled to the main body when the built-in container is sealed, wherein each of the main body and the built-in container is formed of a rigid material, and vapor generated when water within the main body is boiled is discharged between the main body and the built-in container to the outside.

An attached portion of the sealing cover closely attached to the built-in container may be formed of a soft material, and the built-in container and the sealing cover may be closed attached to each other.

A detachable piece for coupling the sealing cover to the main body may be disposed on the sealing cover or the main body.

A seat part on which an upper end of the built-in container is seated may be disposed on an opened upper end of the main body, and a hook part hooked on the seat part of the main body to prevent the built-in container from being further inserted into the main body may be disposed on an opened upper end of the built-in container.

A gap between the seat part of the main body and the hook part of the built-in container may be about 0.05 mm to about 0.15 mm.

An exposing groove for exposing an upper end of the built-in container to the outside may be defined in an upper end of the main body.

An elastic member for elastically supporting the built-in container with respect to the main body may be disposed between an inner bottom surface of the main body and the built-in container, a fixing protrusion in which a lower end of the elastic member is inserted to straighten a position of the elastic member may protrude from an inner bottom surface of the main body.

The heating container may further include a heat insulator surrounding the main body to prevent heat generated by the heater from being released to the outside through the main body.

A height between a bottom surface of the built-in container and a bottom surface of the main body may be about 2 cm to about 5 cm in consideration of a height of the heater.

Advantageous Effects

According to the heating container of the present invention, the following effects may be expected.

First, since the built-in container in which foods are contained is completely sealed against the sealing cover, it may prevent water filled between the main body and the built-in container from being introduced into the built-in container even though the main body is inclined. Also, since it is unnecessary to perform a processing process for forming a discharge hole through which vapor is discharged between the main body and the built-in container to the outside, manufacturing costs may be reduced.

Second, since the exposing groove for exposing the upper end of the built-in container is defined in the upper end of the main body, the built-in container may be easily taken out of the main body.

Third, since the elastic member for elastically supporting the built-in container with respect to the main body is disposed between the inner bottom surface of the main body and the built-in container, the elastic member may be compressed when the sealing cover is closed, and also, the upper end of the built-in container protrudes upward from the main body by the restoring force of the elastic member when the sealing cover is opened. Thus, the built-in container may be easily taken out of the main body.

Fourth, the heat insulator may surround the main body to prevent heat generated by the heater from being lost through the main body, thereby increasing thermal efficiency.

| <The description of reference numerals> | |
|---|---|
| 100: Heating container | 110: Main body |
| 111: Seat part | 112: Detachable piece |
| 113: Exposing groove | 114: Fixing protrusion |
| 120: Built-in container | 121: Hook part |
| 130: Sealing cover | 131: Container insertion groove |
| 132: Packing | 133: Detachable piece |
| 140: Spring | 150: Heat insulator |

MODE FOR CARRYING OUT THE INVENTION

Hereinafter, a heating container according to preferred embodiments of the present invention will be described in detail with reference to the accompanying drawings.

Figure 1:
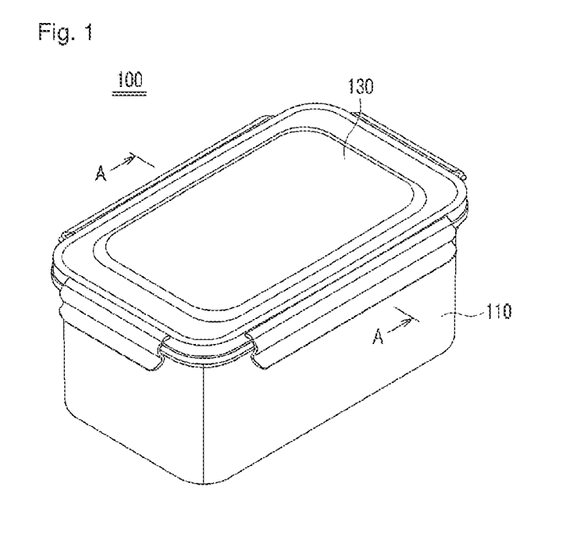
FIG. 1 is a perspective view of a heating container according to a first embodiment of the present invention.
Figure 2:
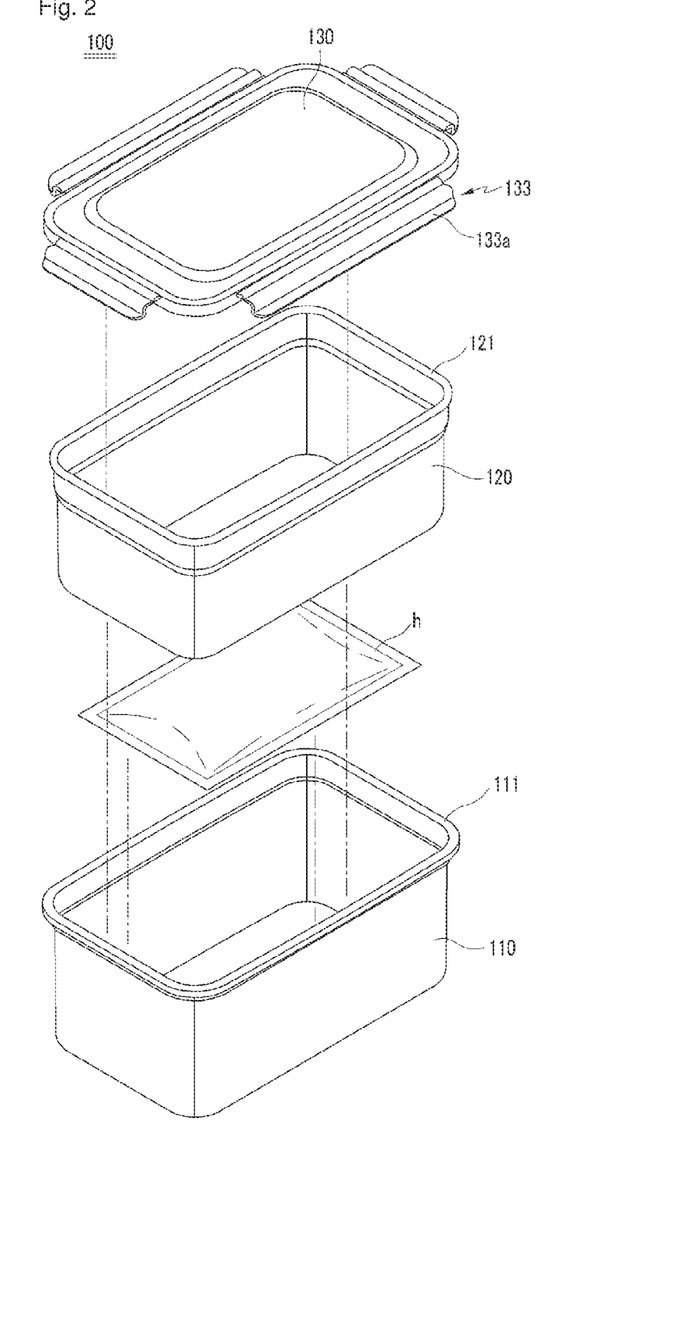
FIG. 2 is an exploded perspective view of the heating container of FIG. 1.
Figure 3:
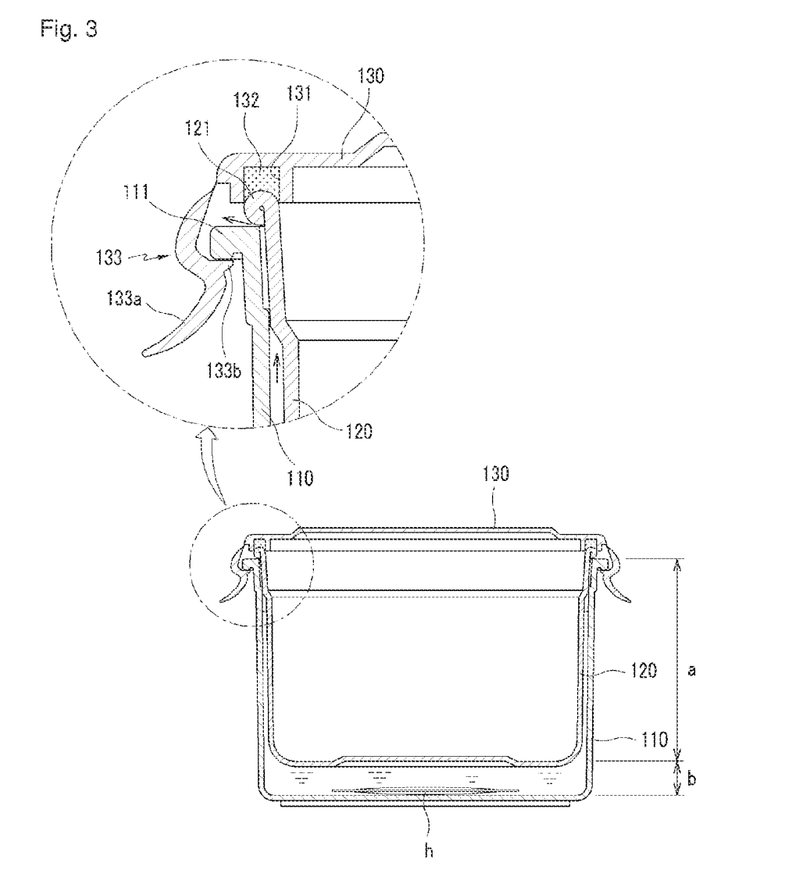
FIG. 3 is a longitudinal sectional view of the heating container of FIG. 1.

FIG. 1 is a perspective view of a heating container according to a first embodiment of the present invention. FIG. 2 is an exploded perspective view of the heating container of FIG. 1. FIG. 3 is a longitudinal sectional view of the heating container of FIG. 1.

A heating container 100 according to the current embodiment includes a main body 110, a built-in container 120, and a sealing cover 130.

The main body 110 includes a heater h therein and provides a space in which water is poured. Also, the main body 110 is opened upward. The main body 110 has various shapes such as a square shape or a circular shape in cross-section. The main body 110 may be manufactured using a rigid material having lack elasticity and heat resistance. A seat part 111 on which an upper end of the built-in container 120 is seated extends horizontally from the opened upper end of the main body 110 in an outward direction of the main body 110.

The built-in container 120 is inserted into the main body 110 and receives foods to be cooked therein. The built-in container 120 has a cross-sectional shape corresponding to that of the main body 110. When the built-in container 120 is inserted into the main body 110, an inner bottom surface of the main body 110 is spaced apart from a bottom surface of the built-in container 120. The heater h together with water is put between the inner bottom surface of the main body 110 and the bottom surface of the built-in container 120. An inner side surface of the main body 110 is spaced apart from a side surface of the built-in container 120 to discharge vapor therebetween. The built-in container 120 provides a space for receiving foods therein and is opened upward. A hook part 121 hooked on the seat part 111 of the main body 110 to prevent the built-in container 120 from being further inserted extends horizontally from an opened upper end of the built-in container 120 in an outward direction. The built-in container 120 may be manufactured using a rigid material such as aluminum or stainless steel having lack elasticity, heat resistance, and superior thermal conductivity.

The sealing cover 130 seals the opened upper portion of the built-in container 120 and is coupled to the main body 110 when the sealing cover 130 seals the built-in container 120. The sealing cover 130 has a shape corresponding to that of the opened upper end of the built-in container 120. Also, a container insertion groove 131 in which the upper end of the built-in container 120 is inserted is defined in an edge of the bottom surface thereof. A packing 132 which is formed of an elastic material and closely attached to the upper end of the built-in container 120 to seal the built-in container 120 is inserted into the container insertion groove 131. A plurality of detachable pieces 133 for detachably coupling the sealing cover 130 to the main body 110 are integrally provided on an edge of the sealing cover 130.

The detachable pieces 133 are vertically, rotatably, and integrally provided on a side surface of the edge of the sealing cover 130. A push part 133a having a concave shape is disposed on a lower end of each of the detachable pieces 133 so that the push part 133a is pushed by a finger when the detachable pieces 133 is fixed to the main body 110. A hook 133b hooked on the seat part 111 of the main body 110 protrudes from an inner side of the push part 133a.

Due to the above-described detachable pieces 133, when the sealing cover 130 is fixed to the main body 110, the push part 133a is pushed inward from the outside to hook the hook 133b on the seat part 111 of the main body 110. Also, when the sealing cover 130 is separated from the main body 110, the push part 133a is pulled outward from the inside to separate the hook 133b from the seat part 111 of the main body 110.

As described above, since each of the main body 110 and the built-in container 120 is manufactured using the rigid material, a fine gap may occur between the seat part 111 and the hook part 121 even though the hook part 121 of the built-in container 120 is hooked and seated on the seat part 111. Vapor generated when water contained in the main body 110 is boiled may be discharged to the outside through the gap. A gap between the main body 110 and the built-in container 120, i.e., the gap between the seat part 111 and the hook part 121 may be about 0.05 mm to about 0.15 mm. When the gap exceeds about 0.15 mm, the vapor may be excessively discharged to decrease heating efficiency of the built-in container 120. On the other hand, when the gap is below about 0.05 mm, it may be difficult to discharge the vapor to significantly increase an internal pressure between the main body 110 and the built-in container 120.

Since the upper end of the built-in container 120 contacts the packing 132 of the sealing cover 130, a gap does not occur. That is, since the built-in container 120 is formed of the rigid material and the packing 132 is formed of a soft material having elasticity, when the sealing cover 130 is coupled to the main body 110, the built-in container 120 and the packing 132 are sealed with respect to each other. Thus, a gap does not occur between the built-in container 120 and the sealing cover 130.

A ratio of a height a of the built-in container 120 within the main body 110 to a height b between the bottom surface of the built-in container 120 and the bottom surface of the main body 110 may be almost 7:3. When the ratio of 7:3 is maintained, heat generated by the heater h is efficiently transferred into the built-in container 120. More particularly, the height b between the bottom surface of the built-in container 120 and the bottom surface of the main body 110 may be about 2 cm to about 5 cm in consideration of a height of the heater h. When the height b exceeds about 5 cm, since an amount of water is too much when compared with the height of the heater h, power consumption may be increased for heating the water. On the other hand, when the height b is less than about 3 cm, since an amount of water is too small when compared with the height of the heater h, the built-in container 120 is not sufficiently heated.

According to the heating container 100 having the above-described components, previously prepared foods to be cooked or heated during the outdoor leisure activation are contained in the built-in container 120, and then the built-in container 120 containing the foods is put into the main body 110, thereby carrying the main body 110 during the outdoor leisure activation in a state where the sealing cover is fixed to the main body 110 using the detachable pieces 133. The foods prepared as described above may be carried while being contained in the built-in container 120. Also, when the foods are cooked after materials for cooking are carried while being contained in a bag, the foods may be taken out of the bag and put into the built-in container 120.

When foods are cooked or heated in the outsides, the built-in container 120 is taken out of the main body 110, and then the heater h is put into the main body 110. Thereafter, a moderate amount of water is poured into the built-in container 120 so that a lower portion of the built-in container 120 is sunken into the water or sufficient contact the water. Then, the built-in container 120 in which the foods are contained is inserted into the main body 110 to close the sealing cover 130.

The heater h contacting the water reacts with the water to heat the water at a temperature of about 92° C. to about 100° C. for several minutes or several ten minutes according to kinds or performance of the heating components. The heated water heats the built-in container 120 to cook or heat the foods.

Since vapor generated while the water is heated by the heater h is discharged to the outside through the fine gap between the upper end of the main body 110 and the upper end of the built-in container 120, an internal pressure of the built-in container 120 is not increased.

Figure 4:
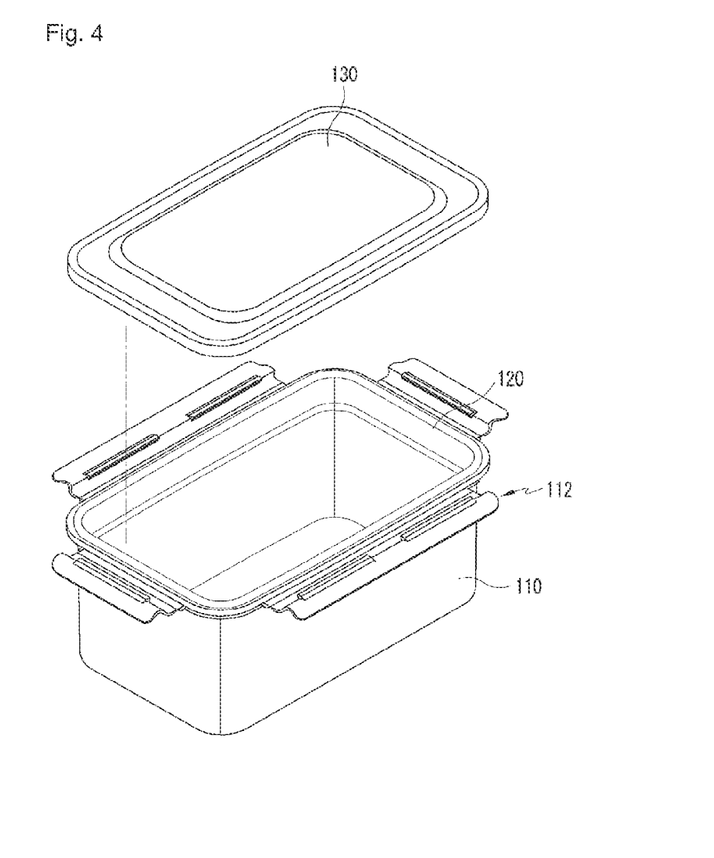
FIG. 4 is an exploded perspective view of a state in which a sealing cover is separated from a heating container according to a second embodiment of the present invention.
Figure 5:
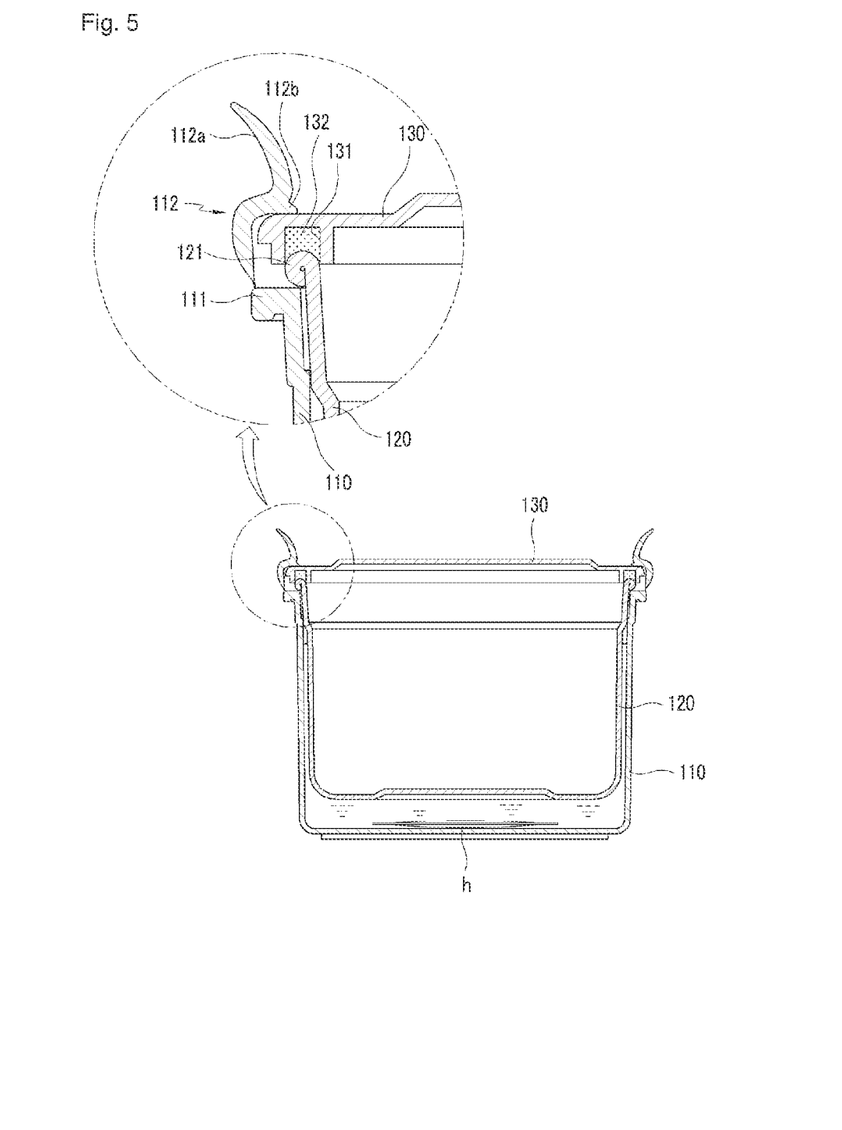
FIG. 5 is a longitudinal sectional view of a state in which the sealing cover of FIG. 4 is coupled to a main body.

FIG. 4 is an exploded perspective view of a state in which a sealing cover is separated from a heating container according to a second embodiment of the present invention. FIG. 5 is a longitudinal sectional view of a state in which the sealing cover of FIG. 4 is coupled to a main body. The same reference numeral as that of the first embodiment denotes the same member having the same function.

In a heating container 100 according to the current embodiment, a detachable piece 112 for fixing a sealing cover 130 to a main body 110 is integrally disposed on an outer surface of an upper end of the main body 110, but is not disposed on the sealing cover 130. A push part 112a having a concave shape is disposed on an upper end of the detachable piece 112 so that the push part 112a is pushed by a finger when the detachable piece 112 is fixed to the sealing cover 130. A hook 112b hooked on an upper end of an edge of the sealing cover 130 protrudes from an inner side of the push part 112a.

Figure 6:
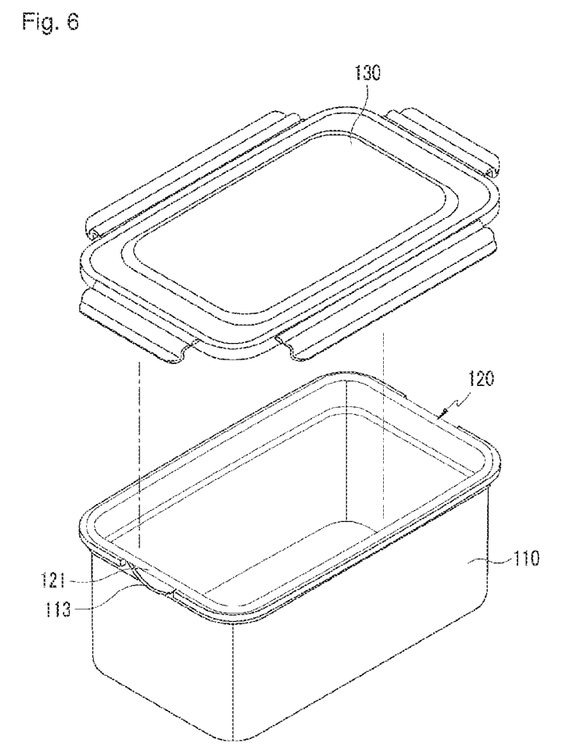
FIG. 6 is an exploded perspective view of a state in which a sealing cover is separated from a heating container according to a third embodiment of the present invention.

FIG. 6 is an exploded perspective view of a state in which a sealing cover is separated from a heating container according to a third embodiment of the present invention. The same reference numeral as that of the first embodiment denotes the same member having the same function.

In a heating container according to the current embodiment, exposing grooves 113 for exposing an upper end of a built-in container 120 to the outside are defined in both sides of an upper end of a main body 110. Thus, the built-in container 120 may be easily separated from the main body 110 by picking up with tongs or using hands putting on gloves. Also, vapor generated when water is heated by a heater may be discharged to the outside through the exposing grooves 113.

Figure 7:
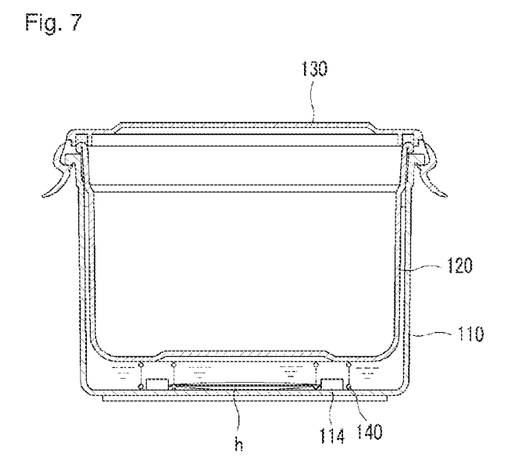
FIG. 7 is a longitudinal sectional view of a heating container according to a fourth embodiment of the present invention.
Figure 8:
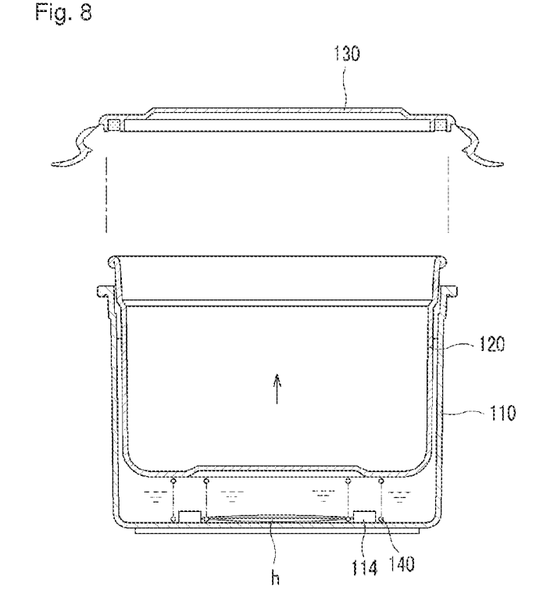
FIG. 8 is a longitudinal sectional view of a state in which a sealing cover is separated in FIG. 7.

FIG. 7 is a longitudinal sectional view of a heating container according to a fourth embodiment of the present invention. FIG. 8 is a longitudinal sectional view of a state in which a sealing cover is separated in FIG. 7. The same reference numeral as that of the first embodiment denotes the same member having the same function.

In a heating container 100 according to the current embodiment, a spring 140 for elastically supporting a built-in container 120 with respect to a main body 110 is disposed between an inner bottom surface of the main body 110 and the built-in container 120. Here, since a lower end of the spring 140 is fitted into the inner bottom surface of the main body 110, when the spring 140 is pushed by the built-in container, a fixing protrusion 114 protrudes to straighten a position of the spring 140.

According to the heating container 100 including the above-described components, as shown in FIG. 7, a sealing cover is coupled to the main body 110 while cooking or heating foods. Thus, the built-in container 120 is pushed and compressed by the spring 140. When the cooking of the foods is completed to open the sealing cover 130, as shown in FIG. 8, an upper end of the built-in container 120 protrudes upward from the main body by a restoring force of the spring 140. Thus, a user may easily take the built-in container out of the main body 110.

Figure 9:
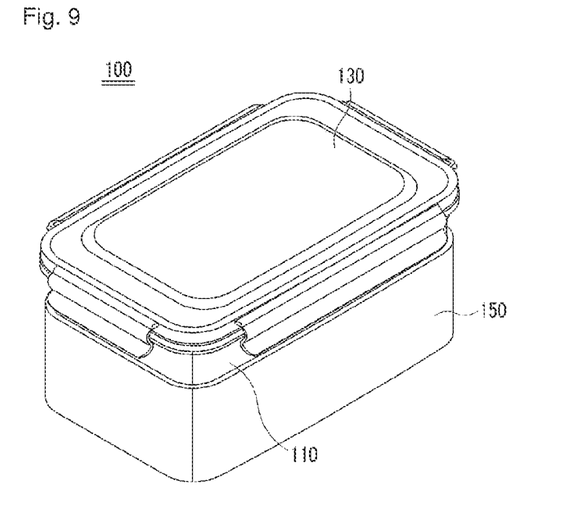
FIG. 9 is a perspective view of a heating container according to a fifth embodiment of the present invention.
Figure 10:
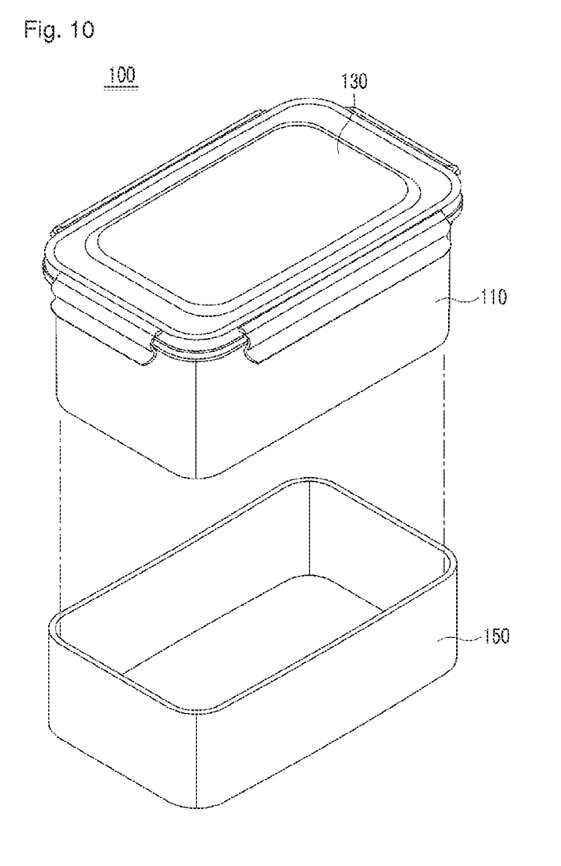
FIG. 10 is an exploded perspective view of the heating container of FIG. 9.

FIG. 9 is a perspective view of a heating container according to a fifth embodiment of the present invention. FIG. 10 is an exploded perspective view of the heating container of FIG. 9. The same reference numeral as that of the first embodiment denotes the same member having the same function.

In a heating container 100 according to the current embodiment, since a main body 100 is surrounded by a heat insulator 150, it may prevent heat generated by a heater h from being released to the outside through the main body 110.

The heat insulator 150 is formed of a heat insulating material such as neoprene. As shown in FIG. 9, the heat insulator 150 may surround all of side and bottom surfaces of the main body 110 or surround only side surfaces of the main body 110.

As described above, although the preferred embodiments of the present invention are described with reference to the accompanying drawings, the present invention is not limited to specific embodiments. The invention may be freely modified by a person skilled in the art within the scope of the claims hereinafter. Also, although the built-in container is taken out of the main body by the user or the elastic force of the spring in the embodiments, the present invention is not limited thereto. For example, a button may be provided on the main body to push the button, thereby taking the built-in container out of the main body.

What is claimed is:

1. A heating container comprising:
    a main body in which a heater is inserted and water is poured;
    a built-in container inserted into the main body, the built-in container providing a space for cooking foods therein; and
    a sealing cover sealing an opened upper portion of the built-in container, the sealing cover being coupled to the main body when the built-in container is sealed,
    wherein each of the main body and the built-in container is formed of a rigid material, and vapor generated when water within the main body is boiled is discharged between the main body and the built-in container to an outside via a gap;
    wherein a seat part on which a first upper end of the built-in container is seated is disposed on a first, opened, upper end of the main body;
    wherein a hook part hooked on the seat part of the main body to prevent the built-in container from being further inserted into the main body is disposed on a second, opened, upper end of the built-in container; and
    wherein the gap between the seat part of the main body and the hook part of the built-in container is about 0.05 mm to about 0.15 mm.

2. The heating container of claim 1, wherein an attached portion of the sealing cover closely attached to the built-in container is formed of a soft material, and the built-in container and the sealing cover are closed attached to each other.

3. The heating container of claim 1, wherein a detachable piece for coupling the sealing cover to the main body is disposed on the sealing cover or the main body.

4. The heating container of claim 1, wherein an exposing groove for exposing the first upper end of the built-in container to the outside is defined in a second upper end of the main body.

5. The heating container of claim 1, wherein an elastic member for elastically supporting the built-in container with respect to the main body is disposed between an inner bottom surface of the main body and the built-in container, a fixing protrusion in which a lower end of the elastic member is inserted to straighten a position of the elastic member protrudes from the inner bottom surface of the main body.

6. The heating container of claim 3, further comprising a heat insulator surrounding the main body to prevent heat generated by the heater from being released to the outside through the main body.

7. The heating container of claim 3, wherein a height between a first bottom surface of the built-in container and a second bottom surface of the main body is about 2 cm to about 5 cm in consideration of a height of the heater.

* * * * *